No. 875,093. PATENTED DEC. 31, 1907.
G. MOHME & A. V. HADLOCK.
TIRE TOOL.
APPLICATION FILED FEB. 8, 1907.
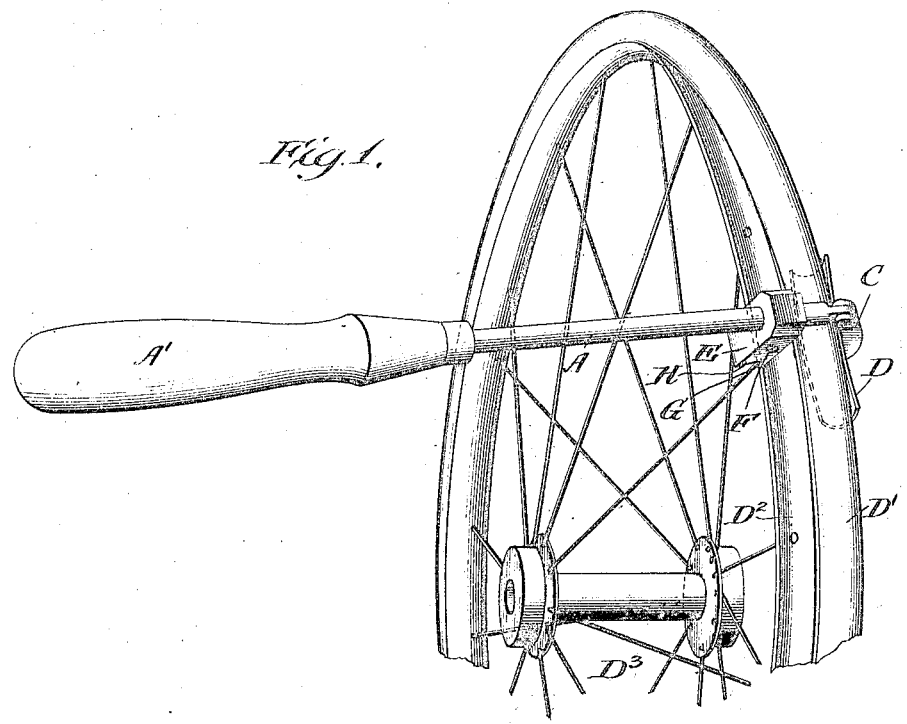
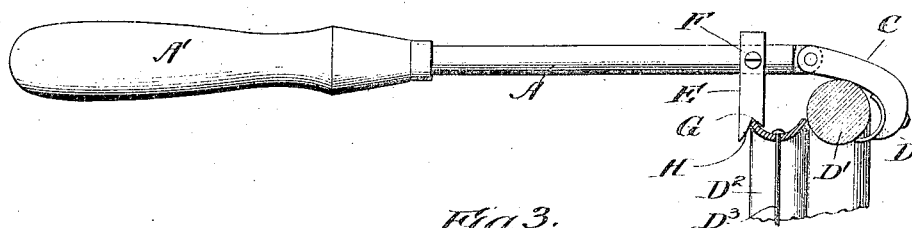
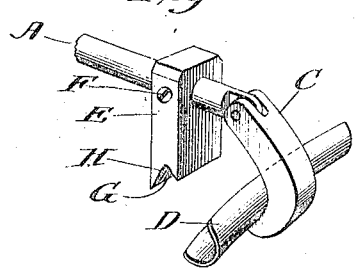
Witnesses
Harry R. L. White
Ray White
Inventors
Gustave Mohme
Aaron V. Hadlock
By Morgan & Rubinstein
Attys

UNITED STATES PATENT OFFICE.

GUSTAVE MOHME AND AARON V. HADLOCK, OF CHICAGO, ILLINOIS.

TIRE-TOOL.

No. 875,093.  Specification of Letters Patent.  Patented Dec. 31, 1907.

Application filed February 8, 1907. Serial No. 356,458.

*To all whom it may concern:*

Be it known that we, GUSTAVE MOHME and AARON V. HADLOCK, citizens of the United States, residing, respectively, at 5906 Wentworth avenue and 616 Garfield Boulevard, in the city of Chicago, county of Cook, and State of Illinois, have invented a new Tire-Tool to be Used for the Purpose of Putting Rubber Tires on the Wheels of Vehicles, of which the following is a specification.

The object of our invention is to provide a hand tool by which rubber tires can be easily and quickly lifted into the rim of the wheel without any injury to the tire by stretching, cutting, or otherwise.

The manner in which we accomplish our purpose is described in the following specifications and illustrated in the accompanying drawings, in which:—

Figure 1 is a perspective side view of a wheel with the tool in position on the wheel and in engagement with the tire adjusted for the movement by which the tire is lifted into the rim of the wheel. Fig. 2 is a cross-sectional view of the rim of the wheel and tire and side view of the tool the several parts being in the same positions as shown in Fig. 1, Fig. 3 is an end view of the adjustable end of the tool.

In the drawings A indicates the handle bar which is adapted in thickness and length to the size of the wheel and tire on which it is to be used. In cross section this bar may be round or angular. On the free end of the bar a handle $A^1$ is affixed. This handle however is not essential as the bar itself may be looped at the end or otherwise adapted for a hand hold. Pivotally secured to the other end of the bar is a pendent hook, C. The curve of this hook is inward towards the handle and is adapted to the thickness of the tire to which the tool is to be applied. Affixed transversely in the inside curve of the hook is a tire holder D. This holder may be of cast, forged or sheet metal and is curved to fit the diameter of the tire $D^1$ and the circular form of the rim $D^2$ of the wheel $D^3$ on which it is to be used. On the bar A is a slidable fulcrum block E provided with an adjustable set screw F by which the block can be secured at the desired point of the bar. In the bottom of this block is a groove G adapted to fit on the edge of the rim of a wheel as shown in Fig. 2. The outside lip H of this groove is longer than the inside lip and is thereby adapted to form a bearing face having pivotal contact with the outside of the rim in the movement of the tool in lifting on the tire.

What we claim and desire to secure by Letters Patent is:—

1. A tire tool of the kind described consisting of a handle bar; a slidable fulcrum block supported on said bar and having a grooved end adapted to rest on the edge of the rim of a wheel; a pendent hook pivotally secured to the end of said bar; a tire holder transversely secured to the inside curve of said hook, the concave curved surface of said holder being towards said fulcrum block on said bar, substantially as described.

2. In a tire tool of the kind described, the combination with the handle bar; of the fulcrum block supported on said bar, said block extending at right angles to the length of said bar and secured thereon by a set screw supported in said block and adapted to engage said bar, the end of said block being grooved transversely to the axis of said bar; the hook pivotally supported on the end of said bar, said hook being adapted to support a tire holder; the tire holder, said tire holder being affixed transversely on the inside curved part of said hook, said holder being formed to fit the cylindrical and circumferential curves of said tire as described.

3. In a tire tool of the kind described, the combination with the handle bar and fulcrum block supported thereon; of a hook pivotally attached to the end of said bar, and the transverse piece affixed in the inside of the ends of said hook, said piece being curved longitudinally and transversely as described.

4. In a tire tool of the kind described, the combination with the handle bar and fulcrum block supported thereon said block having an end groove at right angles to the axis of said handle bar, and the hook pivotally secured to the end of said handle bar; of a tire holder, said tire holder being affixed in the inside curve of said hook and curved longitudinally and transversely and thereby adapted to fit the curves of the tire it is adapted to engage and to lift into the rim of the wheel on which said fulcrum block rests as described.

GUSTAVE MOHME.
AARON V. HADLOCK.

Witnesses:
JOSEPH STAAB,
THOMAS J. MORGAN.